(12) United States Patent
Dörr et al.

(10) Patent No.: US 6,437,303 B1
(45) Date of Patent: Aug. 20, 2002

(54) METHOD AND FURNACE FOR MICROWAVE SINTERING OF NUCLEAR FUEL

(75) Inventors: Wolfgang Dörr, Herzogenaurach; Thorsten Gerdes, Dortmund; Gerhard Gradel, Forchheim; Bruno Schmitt, Dormitz; Monika Willert-Porada, Bayreuth, all of (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/643,183

(22) Filed: Aug. 21, 2000

Related U.S. Application Data

(63) Continuation of application No. PCT/EP99/01078, filed on Feb. 19, 1999.

(30) Foreign Application Priority Data

Feb. 19, 1998 (DE) .......................................... 198 06 868

(51) Int. Cl.[7] .................................................. H05B 6/64
(52) U.S. Cl. ...................... 219/679; 219/695; 219/750
(58) Field of Search .............................. 219/679, 695, 219/750, 702, 719–720, 690–691, 693, 696; 264/0.5; 422/186.04

(56) References Cited

U.S. PATENT DOCUMENTS

| | | | | |
|---|---|---|---|---|
| 3,622,732 A | * | 11/1971 | Williams ..................... 219/695 |
| 4,160,145 A | * | 7/1979 | Rueggeberg ................ 219/691 |
| 4,324,965 A | * | 4/1982 | Naumann et al. ........... 219/696 |
| 4,364,859 A | * | 12/1982 | Ohtsuka et al. ............. 252/643 |
| 4,389,355 A | * | 6/1983 | Thornton et al. ............ 264/0.5 |
| 4,460,522 A | * | 7/1984 | Kinugasa et al. ............ 264/0.5 |
| 5,589,140 A | * | 12/1996 | Takahashi .................... 422/159 |
| 6,097,019 A | * | 8/2000 | Lewis et al. ................. 219/750 |
| 6,121,595 A | * | 9/2000 | Lewis et al. ................. 219/695 |

OTHER PUBLICATIONS

"A Multislotted Waveguide Antenna for High–Powered Microwave Heating Systems" (Rüggeberg), IEEE Transactions on Industry Applications, vol. 1A–16, No. 6, Nov./Dec. 1980, pp. 809–813.

Patent Abstracts of Japan No. 52–101397 (Denki), dated Feb. 20, 1976.

* cited by examiner

*Primary Examiner*—Teresa Walberg
*Assistant Examiner*—Quang Van
(74) *Attorney, Agent, or Firm*—Laurence A. Greenberg; Werner H. Stemer; Gregory L. Mayback

(57) ABSTRACT

A method and a furnace are provided for microwave sintering of nuclear fuel. A stationary wave is generated in an antenna cavity and used to extract microwaves through slots into a resonance chamber containing the nuclear fuel. A position of the slots is adjusted in such a way that a predetermined temperature profile is produced in the nuclear fuel.

23 Claims, 7 Drawing Sheets

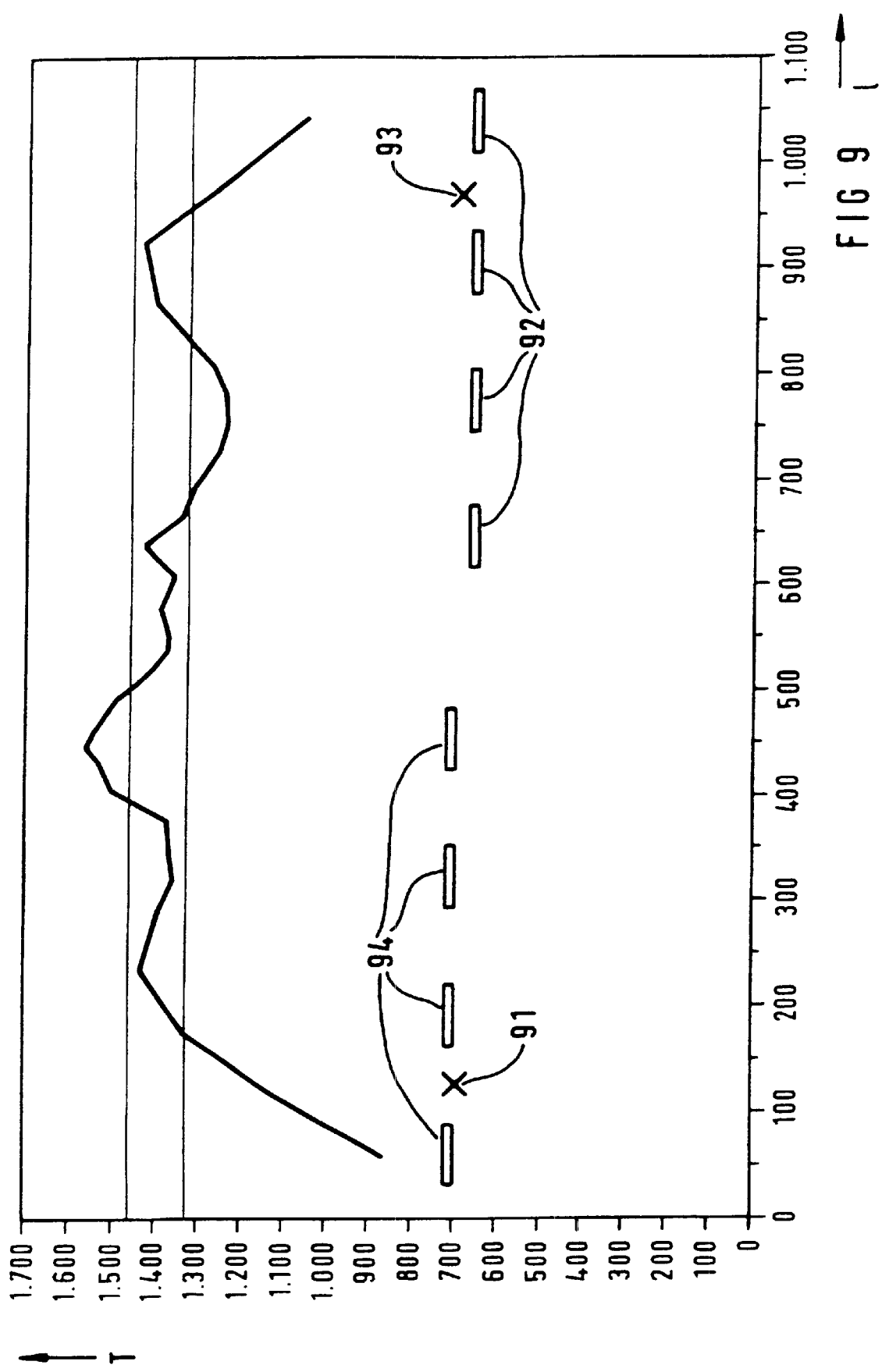

METHOD AND FURNACE FOR MICROWAVE SINTERING OF NUCLEAR FUEL

CROSS-REFERENCE TO RELATED APPLICATION

This application is a continuation of copending International Application No. PCT/EP99/01078, filed Feb. 19, 1999, which designated the United States.

BACKGROUND OF THE INVENTION

Field of the Invention

The invention relates to a method for sintering nuclear fuel in a microwave furnace and to a corresponding microwave furnace.

The industrial use of microwave furnaces is currently restricted to the drying of bodies or materials, sterilizing (for example of foodstuffs), the polymerizing of rubber, curing of plastics and similar processes which take place at moderate temperatures. The ceramics industry is interested in the use of microwaves for sintering, but that has previously been restricted to virtually only a laboratory scale. That is because although past experience shows that shorter sintering periods are adequate, higher temperatures are allegedly necessary (causing greater wear on the furnaces) and altogether higher energy losses occur, although better material properties (for example a finer grain in the ceramic structure) can possibly be achieved. However, until now no products with a satisfactory quality have been achieved at all with microwaves.

However, in International Application No. PCT/EP97/04513, which is not a prior art publication, there is a description of a process by which green compacts that are pressed from unsintered nuclear fuel are sintered to form finished sintered nuclear-fuel compacts. In that case, not only the shape of the sintered bodies and their density but also the mechanical/chemical properties meet the requirements for use in nuclear reactors. In that case, over the same period of time, lower temperatures are necessary than in conventional processes, with the result that maintenance is simplified and that wear and energy losses are reduced. However, the configuration described therein, which is constructed on an empirical basis, is difficult to optimize. The aimed-for homogeneous temperature distribution in the fuel, low temperature losses and low thermal stressing of the furnace parts are difficult to achieve and not always reproducible.

The special characteristic of ceramic nuclear fuel is that it "couples" adequately well to the microwaves, i.e. it can absorb energy from the microwave field, without being electrically conductive at low temperatures. However, at higher temperatures the electrical conductivity increases and the fuel increasingly behaves like a metal. Local overheating, arcs and distortions of the microwave field therefore occur (for example, an already well-sintered, conductive region may hinder the microwaves from penetrating into neighboring regions of the fuel). That results in irregularly sintered, partially melted and deformed pellets. Therefore, the aim is to achieve the most homogeneous possible distribution of the energy and temperature without highly pronounced local maxima.

According to that older proposal, the microwaves are generated by a magnetron or a similar electrical component (for example a klystron) and passed through a waveguide into a furnace chamber (working chamber), which is constructed as a resonator, i.e. it is shielded on all sides by microwave-reflecting (metallic) walls. In that case, the magnetron is regarded as the sole source of the microwave field, the nuclear energy is regarded as just a sink of the field and the waveguides with the resonance chamber are regarded merely as a lossy transmission of the microwaves. It is intended for the geometry of the resonance chamber and of the waveguides to be empirically chosen in such a way that the heat losses are minimized. In other words, as much energy as possible is taken from the field by the nuclear fuel. In addition, by changing the position of the microwaves at the working chamber, the most uniform possible temperature distribution is set in the fuel. In order to provide the necessary power, a plurality of magnetrons are respectively provided over a waveguide, which has one end that merges with its full cross section into the resonance chamber. The individual magnetrons are individually controlled, in order to bring about the most homogeneous possible temperature distribution by superposing the wave fields generated by them.

Uniform quality is achieved in that case only by pushing the material to be sintered through a ceramic tube which has sintering gas flowing through it and extends transversely through the entire resonance chamber. With the unavoidable local inhomogeneities of the wave field and the temperature distribution, all of the regions of the fuel are then subject to the same local conditions, so that ultimately all samples of the fuel should have the same prehistory with regard to the temperatures they have undergone. A precondition therefor is that the microwave field does not undergo any pronounced fluctuations over time. With regard to the temperatures, sintering times, sintering atmospheres and advantageous devices provided for the sintering (for example gas locks for introducing the fuel into the tube through which the sintering gas flows) and further details of a sintering system with microwaves, that document contains a wealth of proposals which can also be applied to the present invention. The content of that document therefore also constitutes part of the content of the present application, with which the radiating of the microwaves into the working chamber (resonance chamber) is improved.

SUMMARY OF THE INVENTION

It is accordingly an object of the invention to provide a method and a microwave furnace for the sintering of microwave fuel of a quality required for use in a reactor, which overcome the hereinafore-mentioned disadvantages of the heretofore-known methods and devices of this general type.

With the foregoing and other objects in view there is provided, in accordance with the invention, a method for treating nuclear fuel in a microwave furnace, which comprises feeding microwaves from a microwave radiator into an antenna cavity; feeding the microwaves from the antenna cavity through a plurality of narrow connecting openings into a resonance chamber; and introducing nuclear fuel into the resonance chamber.

With the objects of the invention in view, there is also provided a microwave furnace for treating nuclear fuel at temperatures of between 20 and 2000° C. and an average temperature of between 1200 and 1800° C., comprising a resonance chamber shielded on all sides by walls reflecting microwaves; a gassing and degassing system associated with the resonance chamber; at least one holder for nuclear fuel in the resonance chamber; an access for introducing nuclear fuel into and removing nuclear fuel from the resonance chamber; an antenna cavity shielded on all sides by walls reflecting microwaves; a separating wall separating the antenna cavity from the resonance chamber, the separating wall having at least one narrow opening formed therein providing an interconnection between the antenna cavity and the resonance chamber; and at least one microwave radiator disposed outside the resonance chamber and feeding into the antenna cavity.

With the objects of the invention in view, there is additionally provided a microwave furnace for producing sintered nuclear-fuel compacts by sintering molded green compacts of nuclear fuel in a sintering gas at average temperatures of between 1200 and 1800° C., comprising an elongate resonance chamber shielded on all sides by walls reflecting microwaves, the resonance chamber having a longitudinal side and a longitudinal direction; a gassing and degassing system associated with the resonance chamber; at least one elongate holder associated with the resonance chamber for holding green compacts; an access associated with the resonance chamber for introduction and removal of green compacts; an elongate antenna cavity shielded on all sides by walls reflecting microwaves; a separating wall separating the antenna cavity from the resonance chamber; the antenna cavity connected to the resonance chamber by a plurality of slots mutually offset in the longitudinal direction of the resonance chamber; at least one waveguide on the longitudinal side of the resonance chamber, the waveguide having an open end leading into the antenna cavity and an opposite closed end; and a microwave radiator disposed at the closed end of the waveguide.

"Nuclear fuel" is understood herein to mean not only uranium oxide itself but also mixtures with other oxides (in particular transuranic elements such as plutonium and thorium) as well as absorber materials (such as gadolinium oxide). The invention is preferably intended for the sintering of pressed shaped bodies of the fuel (so-called "green compacts") to form corresponding sintered compacts (generally cylindrical "pellets"). However, it is also suitable for handling powder or granules at corresponding sintering temperatures. This is because experience with the present invention shows that, at least with the materials suitable for use in a nuclear reactor, a reduction of the sintering temperatures and of the heat losses can be expected from the use of microwaves.

The invention is based on the assumption that the increasing electrical conductivity of the nuclear fuel at high temperatures not only leads to deteriorations in the sintering result but also to unstable conditions in the field. The reason for this is that, in accordance with the way in which it is inhomogeneously heated up, the fuel not only becomes an inhomogeneous sink for the microwave radiation but acts itself in a way similar to a "transmitter", due to the electrical properties, so that unstable feedback to the magnetrons and the radiation emitted by them occurs. This feedback cannot be reliably handled with a configuration which treats the furnace chamber (resonance chamber) merely as a device for transferring the radiation between the magnetron (source) and the nuclear fuel (absorber) that is to be optimized with regard to losses.

Rather, in the first instance the invention uses an antenna cavity which is closed on all sides through the use of (metallic) walls reflecting microwaves and is matched in its dimensions to the microwave radiation being used, in order to produce a stable microwave field (stationary wave). Usually, a magnetron or a klystron is used in microwave technology to generate a frequency of 915 MHz or 2.45 GHz. Generally, a frequency of between 0.4 and 30 GHz is suitable. The dimensions of low-loss waveguides tuned to these frequencies have been investigated, are known and have been described. If these waveguides are closed off at the ends by reflecting walls (so-called "shorting terminations"), they become resonators, in which such frequencies lead to stationary wave fields.

According to the invention, each antenna cavity of this type is preferably assigned an individual magnetron (or klystron). However, the magnetron is not disposed within the stationary wave but is located at the end of a corresponding waveguide, which opens into the antenna cavity with its other end.

The energy required for the sintering is extracted from the field stabilized in this way in the antenna cavity, through a plurality of narrow openings in a wall of the antenna cavity and radiated into the resonance chamber. In comparison with the surface area of a wall of the antenna cavity, these openings, which are preferably formed as slots, are so small that they have virtually no influence on the formation of the stationary wave in the antenna cavity, do not induce any electrical sparkovers, but emit sufficient power. As a result, the feedback of microwave radiation into the antenna cavity is also minimized. Such "slot antennas" have previously already been proposed for communications technology, in order to emit corresponding fields in virtually an infinite environment from which only slight reflections are returned. This is intended to produce a stabilized uniplanar radiator with a radiant power distributed uniformly over the surface area of the radiator.

The technology of such a slot antenna is described in a paper entitled "A Multislotted Waveguide Antenna for High-Powered Microwave Heating Systems" by Werner R üggeberg in IEEE Transactions on Industry Applications, Vol. IA-16, No. 6, November/December 1998, pages 809 to 813. Described in the paper are procedures and formulas with which the emitted power as well as the number and configuration of the slots are determined, in order to obtain a desired uniplanar distribution of the radiant power. In that case, the irradiated material is regarded as an infinite space in which considerable energy is emitted but the emitted energy is not reflected. Therefore, only low temperatures are observed at the location of the absorber as well. If, however, a metallic body which could simulate nuclear fuel heated to a high temperature with respect to reflection and absorption is brought from outside into the vicinity of the slots, there is a breakdown of the stationary wave in the antenna cavity in which, according to Ruggeberg, the magnetron is also disposed. Arcs occur along with considerable damage to the walls and the magnetron of the antenna and to the reflector. When such a slot antenna according to Rüggeberg was fitted into the configuration according to International Application No. PCT/EP97/04513, that damage occurred even though the antenna power was restricted and the average temperature in the nuclear fuel still did not reach sintering temperature.

Nevertheless, the invention provides an antenna cavity which is fed by a microwave radiator and has a wall with at least one narrow opening (advantageously: a plurality of slots) for the coupling of microwaves into a resonance chamber contained in the nuclear fuel. However, the slots are constructed in such a way that the feedback to the antenna cavity by reflections at the nuclear fuel is no longer disruptive. Rather, the changed configuration of the slots can allow the temperature distribution in the nuclear fuel to be controlled and set.

According to the invention, a plurality of such slot antennas are advantageously used, in order to couple the energy necessary for sintering the fuel into the resonance chamber. The resonance chamber advantageously has the same length as the antenna cavity and the antenna cavity is disposed on one longitudinal side of the resonance chamber. In the simplest case, the antenna cavity is situated directly at the resonance chamber, so that the two chambers are separated by a common wall, which has the narrow openings or slots.

If the already mentioned metallic behavior of highly heated fuel is taken into consideration, the material to be sintered consequently becomes not only a strong absorber, but a "transmitter" (or least a reflector), the feedback of which to the stationary wave in the antenna cavity must not be ignored. Rather, the resonance conditions in the antenna cavity are greatly detuned by the feedback with the nuclear fuel.

If it is desired to avoid this feedback, the number and/or surface area of the slots could be reduced. That has the effect of reducing the energy being fed back, but the energy absorbed by the nuclear fuel and required for the sintering is also reduced, so that in practice the fuel is not heated to the necessary sintering temperature. That approach is consequently not feasible.

Rather, the system must be regarded as a feedback system and the antenna cavity with the slots must be constructed from the outset for the detuned conditions. This is possible empirically in a simple way by changing the length of the antenna cavity through the use of displaceable metallic terminations and by varying the position of the slots in the walls of the antenna cavity. It is found that, by changes of this type, a significantly more homogeneous distribution of the temperature and field in the resonance chamber can be achieved and the damage mentioned above can be avoided.

Other features which are considered as characteristic for the invention are set forth in the appended claims.

Although the invention is illustrated and described herein as embodied in a method and a furnace for microwave sintering of nuclear fuel, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 9 is a graph of a temperature profile which was recorded in the furnace of FIG. 7.

DESCRIPTION OF THE PREFERRED EMBODIMENTS

Figure 1:
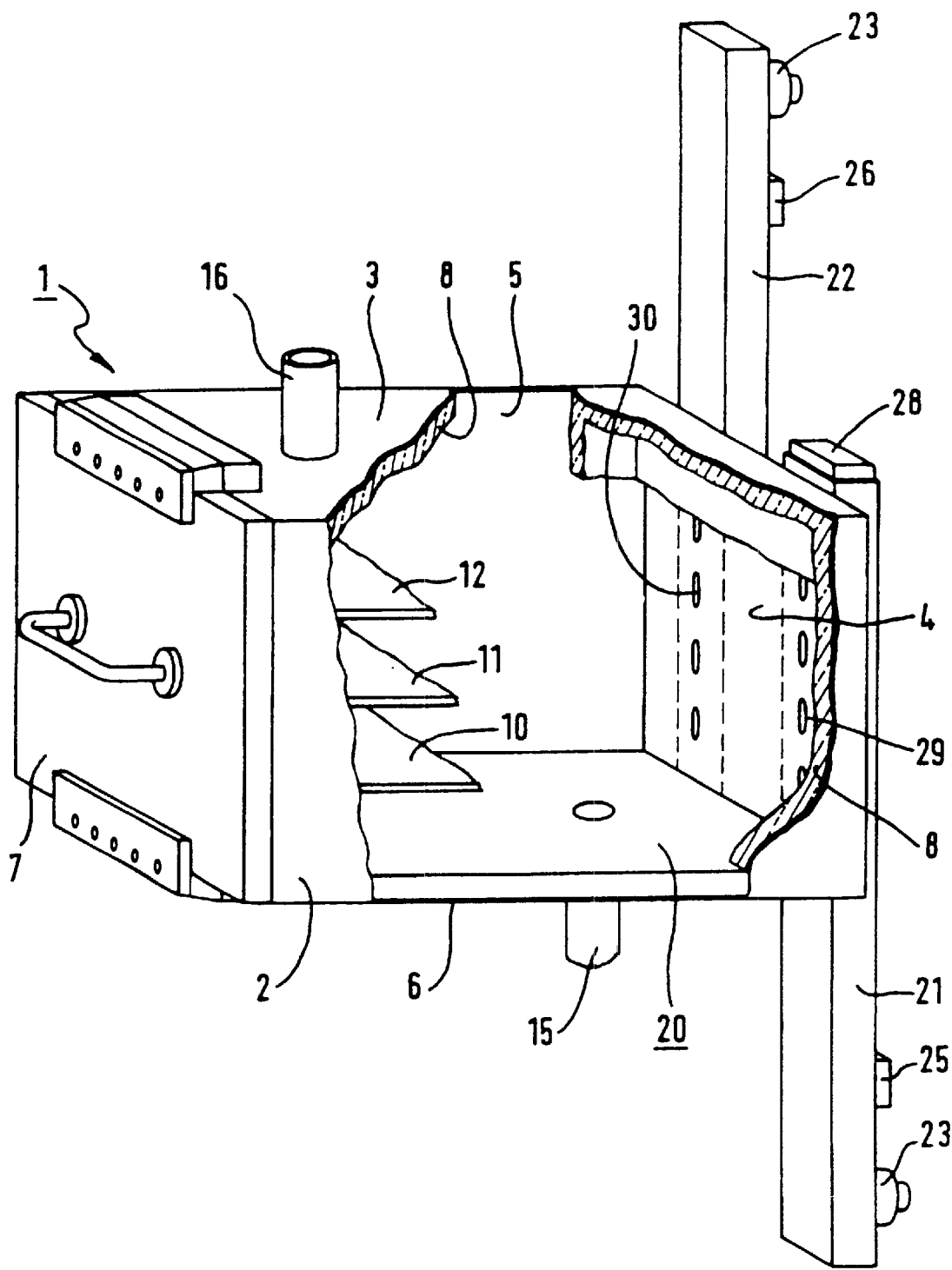
FIG. 1 is a diagrammatic, partly broken-away, perspective view of a first exemplary embodiment of a microwave furnace according to the invention for carrying out the method according to the invention.

Referring now to the figures of the drawings in detail and first, particularly, to FIG. 1 thereof, there is seen a microwave furnace 1 in which parts of a side wall 2 and of a top wall 3 have been broken away in order to make an interior of a cuboidal resonance chamber 20 visible. The resonance chamber is closed off at the sides by the side wall 2, a side wall 5 parallel to the latter, the top wall 3 and a corresponding bottom wall 6. The resonance chamber is closed off toward the rear by a rear wall 4. A corresponding front wall 7 is constructed as a door which can be securely screwed in place. All of these walls are formed from steel sheet having a wall thickness of 3 mm. Generally, any material (in particular metal) may be considered as long as it reflects the microwaves, is temperature-resistant at temperatures of up to 800° C. and is chemically resistant, that is in particular it does not form any scale, both in a ventilated state of the resonance chamber 20 and when it is filled with sintering gas intended for the sintering. Inner wall surfaces are advantageously polished or mirrored, in order to facilitate reflection of the microwaves.

The inner surfaces are lined with a thermal insulation 8, which is largely transparent to microwaves. Ceramic material, in particular aluminum oxide in a porous state, may be considered therefor. In FIG. 1, this thermal insulation has likewise largely been broken away, so as to show (only partially represented) holders 10, 11, 12, on which three layers of nuclear fuel can be introduced and held. Furthermore, a gas feed 15 and a gas discharge 16 are provided, in order to introduce sintering gas (for example dry hydrogen with an oxygen partial pressure of $10^{-8}$ atmospheres or below) into the chamber or extract it therefrom.

The resonance chamber 20, which is shielded through the use of the walls 2 to 7, is supplied at the rear wall 4 with which are generated in corresponding antenna cavities 21 and 22. These antenna cavities 21, 22 are also shielded on all sides by similar walls. Magnetrons 23 each protrude into a terminated end of a respective one of the antenna cavities. Housings 25, 26 can also be seen for devices which are customary in microwave technology for measuring waves emanating from the magnetron and waves reflected and for attenuating the reflected waves through the use of a diaphragm (for example a commercially available configuration including three reflector rods disposed variably in the antenna cavity).

It can also be seen that another end of the antenna cavity 21 is terminated by a shorting plunger 28, which protrudes with a variable length into the antenna cavity in order to change this cavity for adjustment.

It is essential that the separating wall respectively disposed between the antenna cavities 21 and 22 and the resonance chamber 20 has narrow openings 30. The openings 30 only take up a small fraction of a common surface area between the antenna cavities and the resonance chamber.

When the door is open, one or more layers of granules or powder of the nuclear fuel can be introduced into the furnace, which is subsequently closed and charged with a gas required for the intended treatment. This furnace is primarily intended for processes with relatively low power, for example the drying of powders or laboratory investigation of small amounts. In particular, as a departure from FIG. 1, it appears to be more advantageous for the sintering of large amounts at high temperatures, to place the magnetron and the instrumentation mentioned above, with measuring equipment and diaphragms, in waveguides, rather than in the antenna cavity is itself, where it is at risk from a stationary wave formed there, especially for the sintering of molded green compacts. The dimensioning of the cuboidal resonance chamber (50 cm wide, 30 cm high, 60 cm long) is also not optimized. However, it can be seen as particularly essential that the coupling in of the microwaves does not take place through a waveguide, which represents virtually no obstacle for the microwaves and generates virtually no reflection at its opening to the resonance chamber. Instead, the elongate resonance chamber is terminated at both of its end surfaces and has lateral slots 29 which are preferably oriented in the longitudinal direction for extracting the microwaves.

The cross section perpendicular to the direction of entry of the microwaves into the resonance chamber preferably has edge lengths which are at least one quarter and at most 4 times the wavelength of the generated microwaves in air. A cylindrical resonance chamber is also possible (but difficult to optimize), as long as it has a cross section with approximately the same surface area as a cuboidal resonance chamber defined by these limit values.

Figure 2:
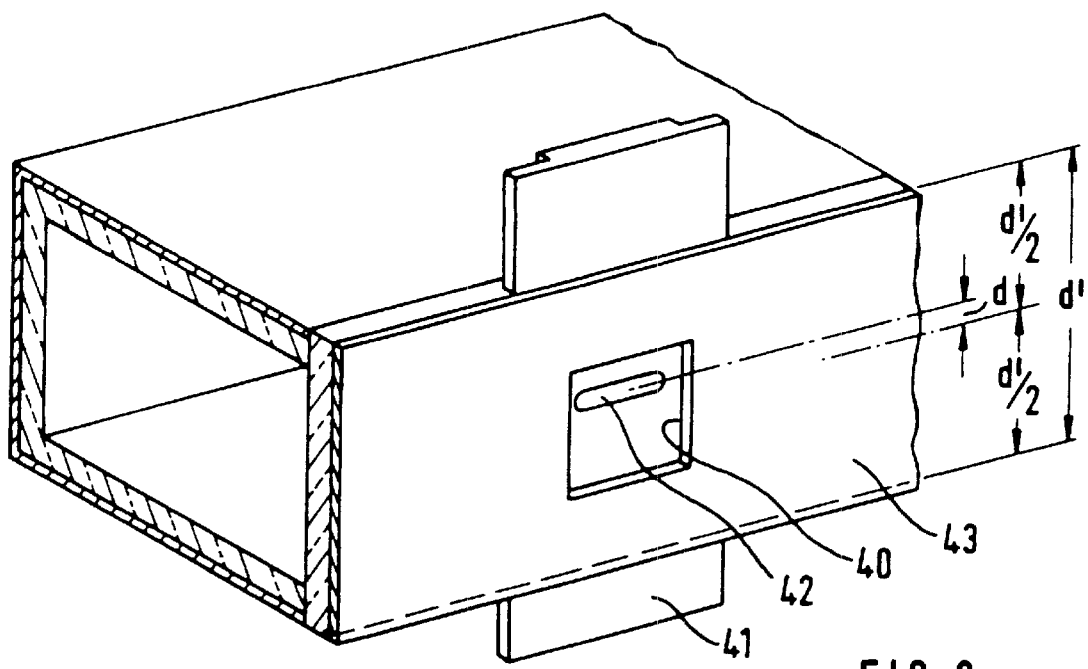
FIGS. 2 and 3 are fragmentary, perspective views of an antenna cavity with variable slots for extracting microwaves.
Figure 3:
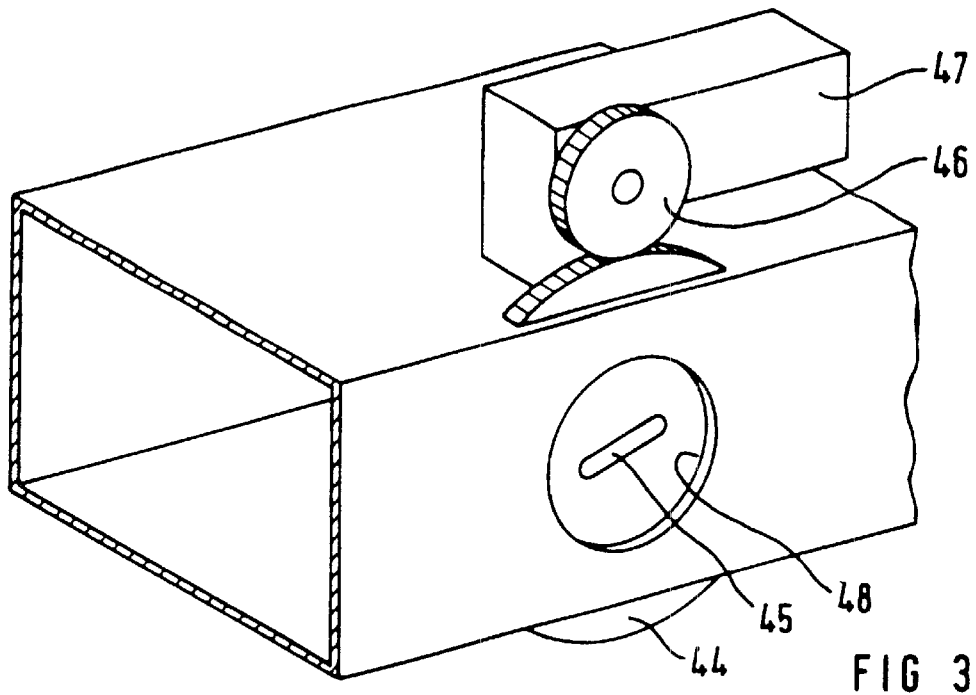

The spacing of the slots in the longitudinal direction of the antenna cavity may be matched to the frequency of the magnetron (2.45 GHz) or to the corresponding stationary wave and be predetermined as a fixed value. However, in each case the distance from the center of the antenna cavity determines the power emitted through the slot and can be adjusted (for example empirically). FIG. 2 illustrates a portion of a cuboidal antenna cavity which is separated from the resonance chamber by a separating wall 43 that is composed of a plurality of metal sheets and has a width d'. A window 40, which is made in the separating wall, is largely covered by a slide 41 held in the wall. A longitudinal slot 42 is made in this slide 41. The longitudinal slot 42 is consequently disposed at a variable distance d from a center line of the wall 43. A reduction of the energy emitted through the slots can also be achieved according to FIG. 3, which shows a rotatable disk 44 with a corresponding slot 45. An orientation of the slot 45 within a corresponding window 48 can consequently be changed. In this case, the energy emitted is virtually proportional to the projection of the slot onto the longitudinal direction, i.e. the maximum energy is emitted when it is oriented in the longitudinal direction. The slots may already be fixed during the planning of the furnace by corresponding empirical tests under operating conditions and then be adopted in the layout of the furnace. However, it may prove to be necessary to require a response to changes in a temperature profile during operation of the furnace to be provided by corresponding changing of the slots. For this purpose, FIG. 3 shows a driving wheel 46 for the disk 44. The driving wheel 46 is driven by a servo motor 47 in order to change the position of the slot in an operationally dependent manner.

Figure 4:
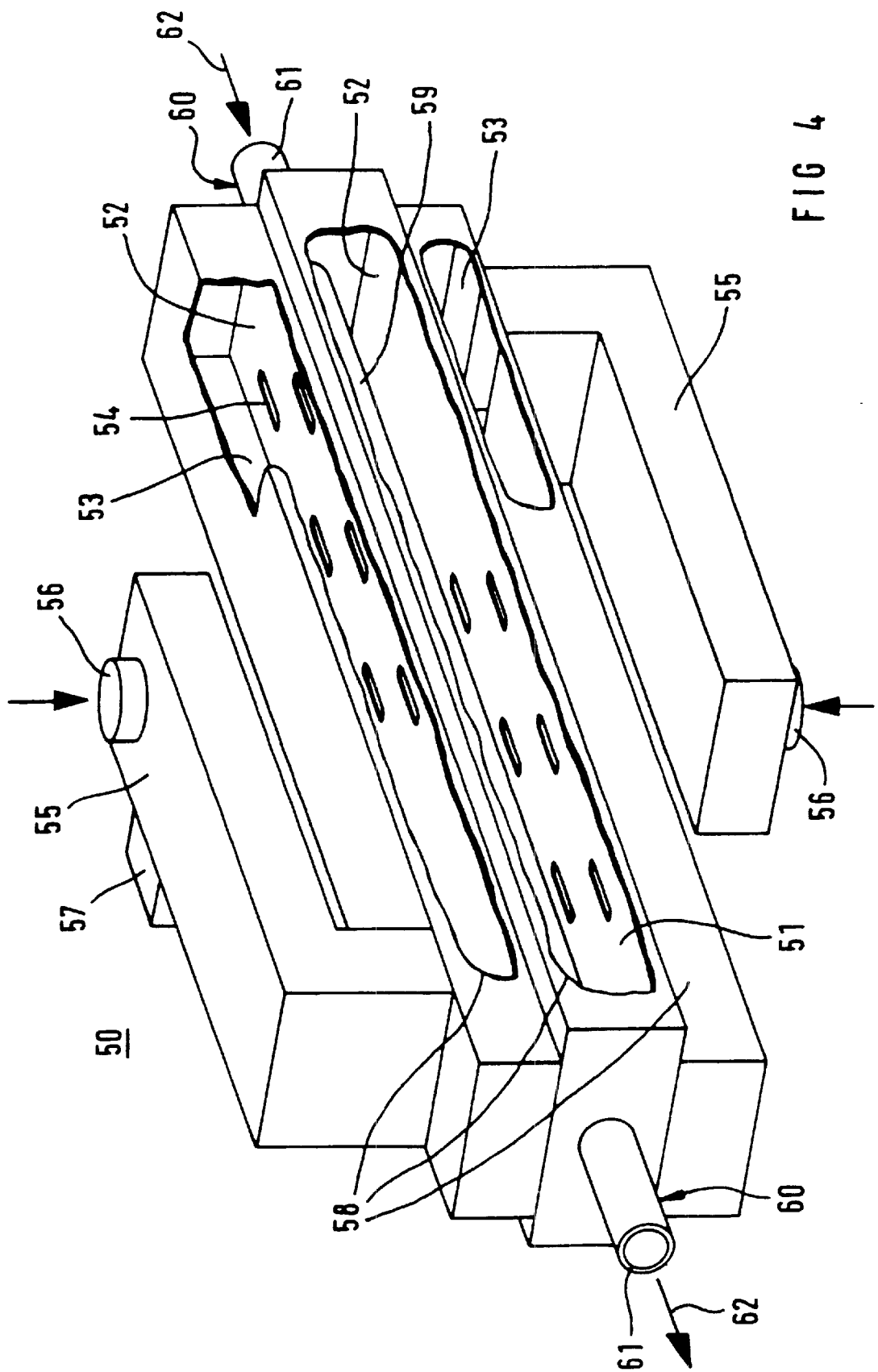
FIGS. 4 and 5 are partly broken-away, perspective views of two further exemplary embodiments of a microwave furnace according to the invention.

FIG. 4 diagrammatically illustrates a furnace 50 which is constructed, in particular, for the sintering of molded green compacts of nuclear fuel to form sintered fuel compacts that are suitable for reactor use.

A central part of this furnace 50 is an elongate, cuboidal resonance chamber 51, adjoined on two opposite sides by respective antenna cavities 53 separated by respective common walls (separating walls) 52. A plurality of longitudinal slots or narrow connecting openings 54 which are respectively made in the common walls 52 have a configuration that is initially represented arbitrarily herein. The antenna cavities 53 are likewise cuboidal, but have a somewhat smaller cross section, which coincides with a cross section of waveguides 55, that are angled and open out into the resonance chamber. Electrical connections and alignments of respective magnetrons or microwave radiators 56, which in each case protrude into a terminated end of one of the waveguides 55, are denoted by arrows. A socket 57 is disposed between the magnetron 56 and an opening of the waveguide into the antenna cavity. The socket 57 is used for measuring instruments, which separately sense the emanating microwave and returning microwave, and for a diaphragm, such as are used in such waveguides in the prior art.

Reference numeral 58 indicates that the cavities may be lined or largely filled with a thermal insulation (not illustrated in detail), which is largely transparent to the microwaves being used. Such an insulation, which is disposed within a space enclosed by reflecting walls, in any event is advantageous for the resonance chamber (at least its unslotted walls), since it protects the material of the wall against the thermal radiation of the heated nuclear fuel. A thermal radiation of this type is not to be feared for use in the antenna cavities and it may be sufficient just to polish or mirror the inner wall surfaces, or to provide a high reflection and low absorption in some other way. Since the customary materials for thermal insulations, for example aluminum oxide, themselves begin to absorb microwaves as the temperature increases, it may be advantageous to use materials in the antenna cavities which have a lower absorption for the microwaves than aluminum oxide, or to dispense with a thermal insulation.

Furthermore, FIG. 4 shows a ceramic tube 59, which extends through the entire length of the resonance chamber. On one hand, this ceramic tube serves for receiving material to be sintered (i.e. the green compacts), which is pushed through the tube. On the other hand, the sintering gas is also passed through the ceramic tube 59, preferably in counterflow to the direction of movement of the material to be sintered.

It is not shown in FIG. 4 that in each case the ceramic tube 59 merges into a gas lock outside the resonance chamber. On one hand, the gas lock permits the loading and unloading of the resonance chamber with the material to be sintered and the sintering gas. Gas locks of this type are described in the above-mentioned International Application No. PCT/EP97/04513. The position of these gas locks (omitted for reasons of overall clarity) is indicated by an arrow 60. It is advantageous in this case if the material to be sintered passes a metal tube or access 61, before entering and after leaving the resonance chamber. The metal tube 61 is formed onto the end walls of the resonance chamber and may be constructed as an extension or concentric sleeve of the ceramic tube 59. A metal tube of this type has the effect of causing the microwave field to be discharged within the tube, that is at the location where the material to be sintered is supplied and removed, without penetrating to the outside. On the other hand, a zone without radiation of this type, adjoining the end walls of the resonance chamber, may advantageously serve as a warming-up or cooling-down zone for the nuclear fuel. Consequently, the nuclear fuel may be introduced into the furnace from the front wall which can be seen at the front left. The nuclear fuel is transported through the ceramic tube 59 and is removed at the rear end. A counterflow which is indicated by arrows 62 and initially has a low temperature, can cool the hot and sintered fuel emerging at the rear end, in order to then be heated up itself within the furnace by contact with the hot fuel and warm up the cool fuel fed in at the front end.

Figure 5:
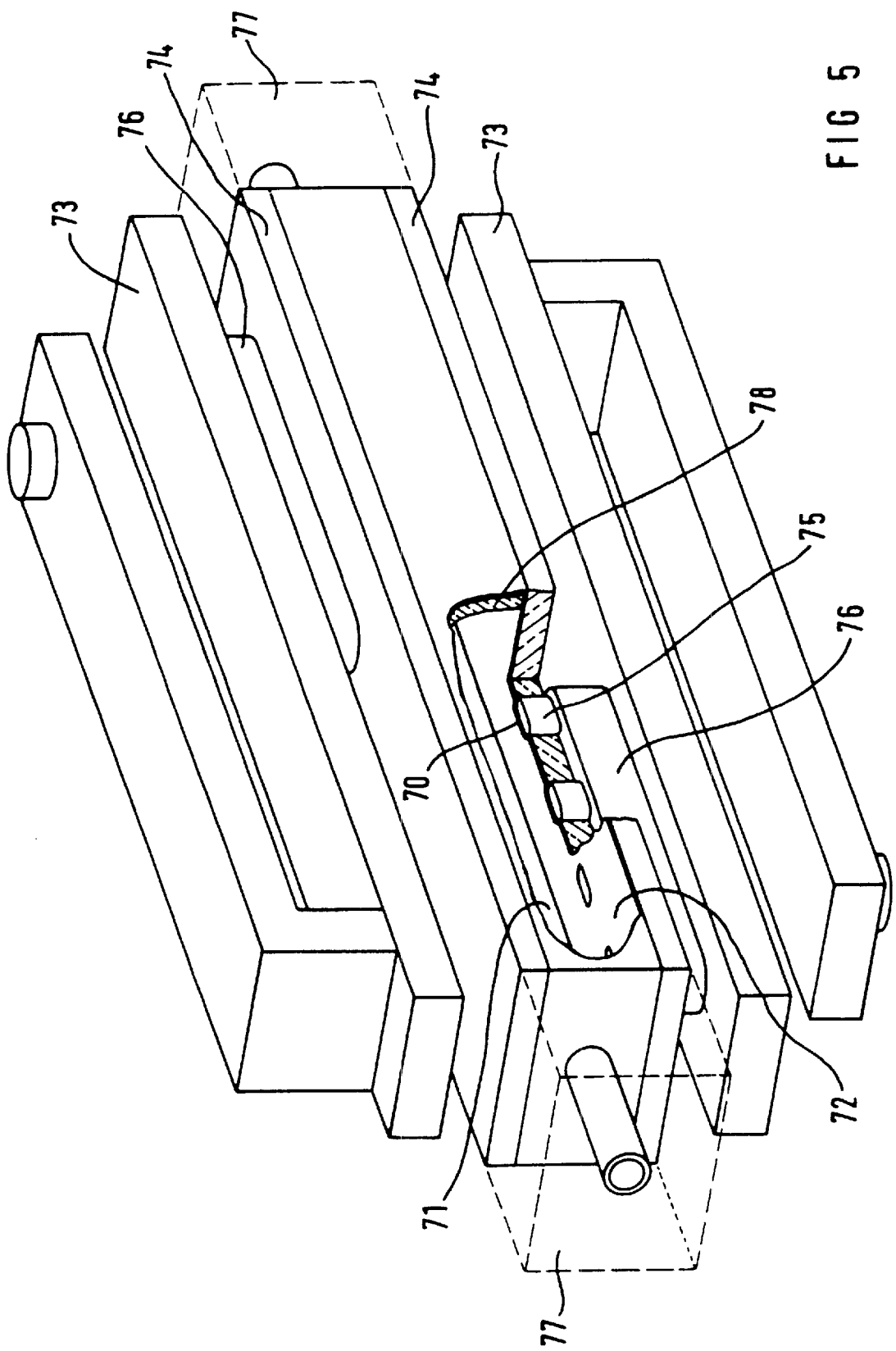

Virtually the same furnace shown in FIG. 4 is shown in FIG. 5. Apart from the configuration of the slots, which is still to be discussed, the only difference is that in this case the microwaves emerging from slots 70 are directed straight at a ceramic tube 71 for transporting the material to be sintered, without a further insulating material lying in between. Instead, a thermal insulation of a separating wall between a resonance chamber 72 and one of two antenna cavities 73 is respectively realized by insulating layers 74, which in this case are disposed outside metallic walls of the resonance chamber 72. Consequently, a configuration of individual walls disposed parallel to one another and at small distances is used in this case as the separating wall. The microwaves emitted from the antenna cavities 73 gain access to the slots 70 at the sides of the resonance chamber through the use of corresponding tubular connecting pieces 75, which for their part may be surrounded by a packing 76 of insulating material.

However, there are panelings of insulating material 78 on the unslotted longitudinal walls in the interior of the resonance chamber 72. The panelings of insulating material 78 prevent heating up of the side walls and consequently also serve for protecting personnel against coming into contact with overheated parts. Furthermore, it can be seen that gas locks are respectively fitted in housings 77 on front and rear walls outside the resonance chamber. The metallic walls of the resonance chamber are preferably not insulated on this front side and rear side. Instead, this insulation is only applied to the housing 77 of the gas locks, so that these housings 77 form a heating-up zone and cooling-down zone which are not exposed to microwaves in practice.

This insulation according to FIG. 5 is preferably provided only if it is intended to work in the upper range of the envisaged sintering temperatures (approximately around 1800 to 1850° C.) and if commercially available, highly porous ceramic bodies of aluminum oxide couple too strongly to the radiation emerging directly from the slots and do not withstand corresponding thermal loads over an extended period of time. Alternatively, it may also be attempted not to use highly porous solid bodies at these locations but, for example, corresponding fibrous material.

Figure 6:
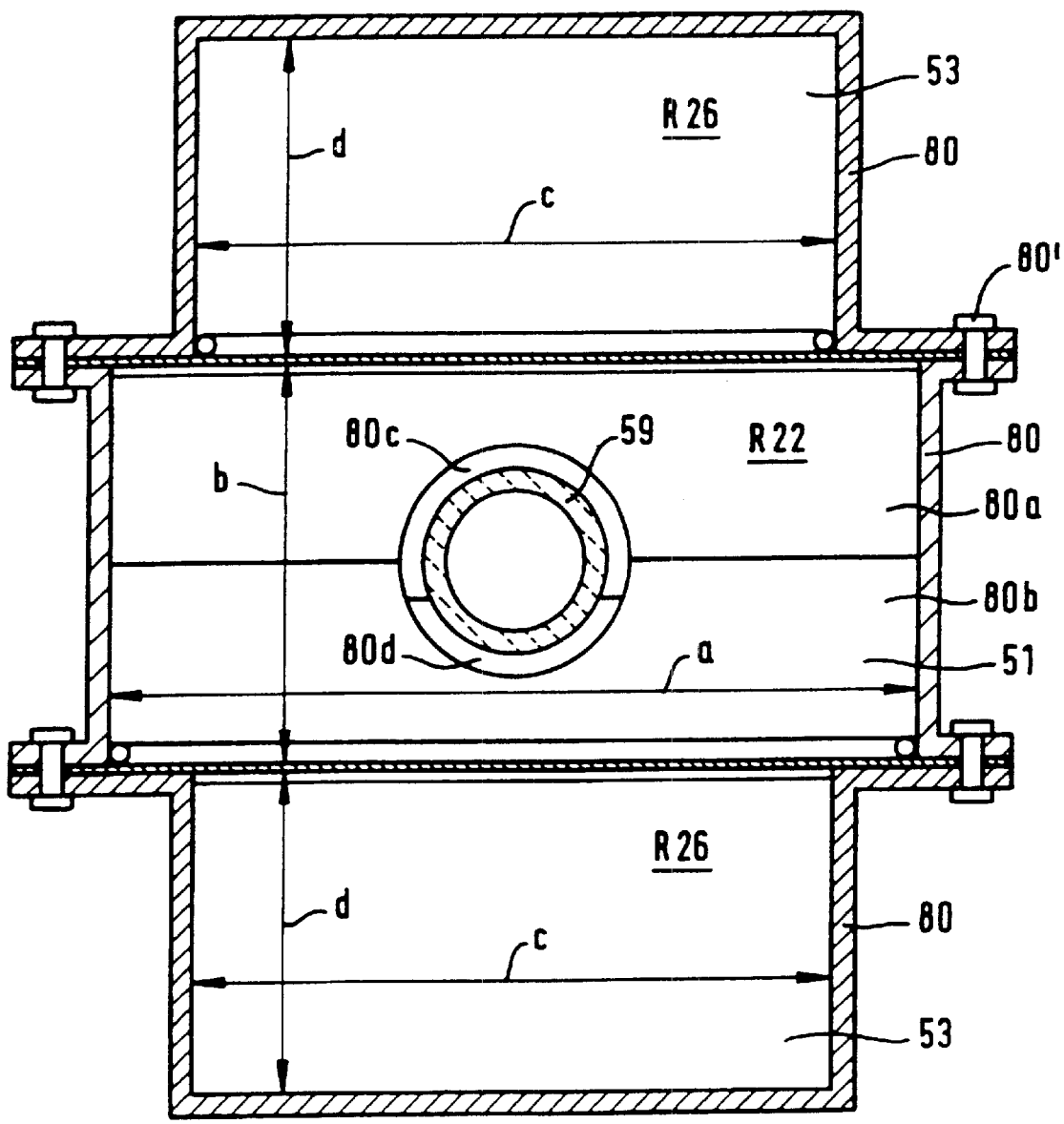
FIG. 6 is a cross-sectional view of the microwave furnace according to FIG. 4.

FIG. 6 shows a cross section through the metallic walls of the resonance chamber 51 and of the antenna cavities 53 of the furnace 50 according to FIG. 4. The cross section of the resonance chamber in this case is given by dimensions which are known in microwave technology for corresponding waveguides and is designated "R22", while the cross section of the antenna cavities 53 corresponds to a waveguide cross section with a designation "R26". Dimensions of a=108 mm and b=54 mm were chosen for the resonance chamber, and c=86 mm and d=43 mm were chosen for the antenna cavities. Walls 80 which are welded together from angled 3 mm thick steel parts are securely braced together through the use of screw bolts 80' that also hold 1 mm thick INCONEL plates, in which the above-mentioned slots in the separating wall are made between the antenna cavities and the resonance chamber.

Furthermore, FIG. 6 shows that the cross section of the resonance chamber 51 is virtually filled by two highly porous ceramic blocks 80a, 80b of aluminum oxide ($Al_2O_3$), which are placed one on top of the other and merely have a clearance 80c in their center for the ceramic tube 59 which was already mentioned. Rests 80d for supporting the tube 59 may protrude into this clearance 80c at a number of positions.

The cross section of the antenna cavities also corresponds to the cross section of the waveguides, which respectively open at one end into an antenna cavity and at the other end have the microwave radiator assigned to this cavity. The power of these radiators in FIG. 4 is 1.25 kW in each case.

Pellets were sintered with this power at approximately 1200° C. in a $CO_2$ atmosphere or 1300° C. in an $H_2$ atmosphere. The pellets absorbed approximately 140 W during sintering, with 80 to 150 W being absorbed and transported away by the sintering gas and 200 W being reflected back to the radiator.

In order to provide faster sintering at higher temperatures and correspondingly higher power (in each case 2 kW), the height b of the resonance chamber was chosen to be b=100 mm, but the remaining dimensions were retained. The length of the antenna cavities and of the working chamber and the length of the microwaves between the magnetron and the entrance into the corresponding antenna cavity in each case were approximately 1.1 m.

Figure 7:
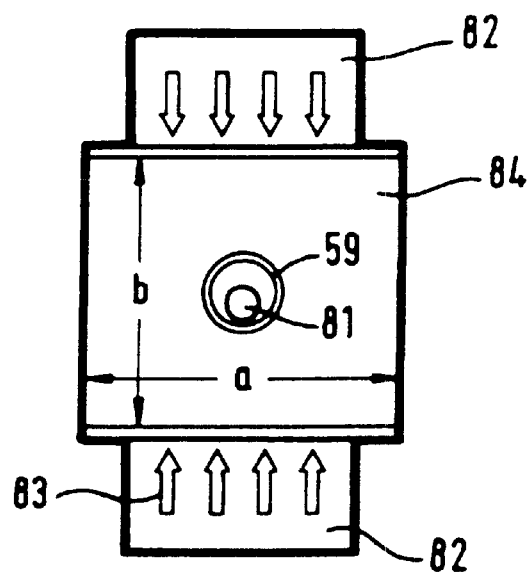
FIGS. 7 and 8 are side-elevational views of microwave furnaces according to the invention.

With this length, the ceramic tube 59 shown in FIG. 7 can be produced in one piece. It is then sufficient if the green compacts 81 are pushed one after the other into the ceramic tube through the use of a device shown in International Application No. PCT/EP97/04513 and are then collected at the other end in the sintered state.

Feeding occurs through the use of two magnetrons feeding respectively into antenna cavities 82, although all that is indicated of the magnetrons in FIG. 7 is microwave radiation 83 of 2 kW in each case emerging through the slots. Therefore, there is sufficient power available in the resonance chamber 84 to sinter a number of layers of the nuclear fuel without the heat losses being increased significantly by this multiplication of the throughput.

In this case it should be ensured that the nuclear fuel is distributed approximately centrally about a center axis of the resonance chamber over the cross section of the latter. A corresponding holder which is shown in FIG. 8 accommodates three pellet columns or layers 86 that are respectively guided in dedicated tubes 87 in a resonance chamber 85.

The microwave furnaces described herein are not restricted to the use of molded green compacts which are pushed into a tube from the front side and removed from the rear side. It is also possible, for example, to introduce the nuclear fuel into the furnace in the form of boats or other carriers, for example only from the front side, from which they can then also be removed again. However, it is advantageous in such cases as well not to load the entire resonance chamber with sintering gas, and consequently subject the resonator walls to an aggressive atmosphere, but instead to conduct the gas in a corresponding, gas-tight ceramic tube, for example a tube 88 indicated in FIG. 8, which encloses the holder for a number of separate layers of the fuel.

Figure 8:
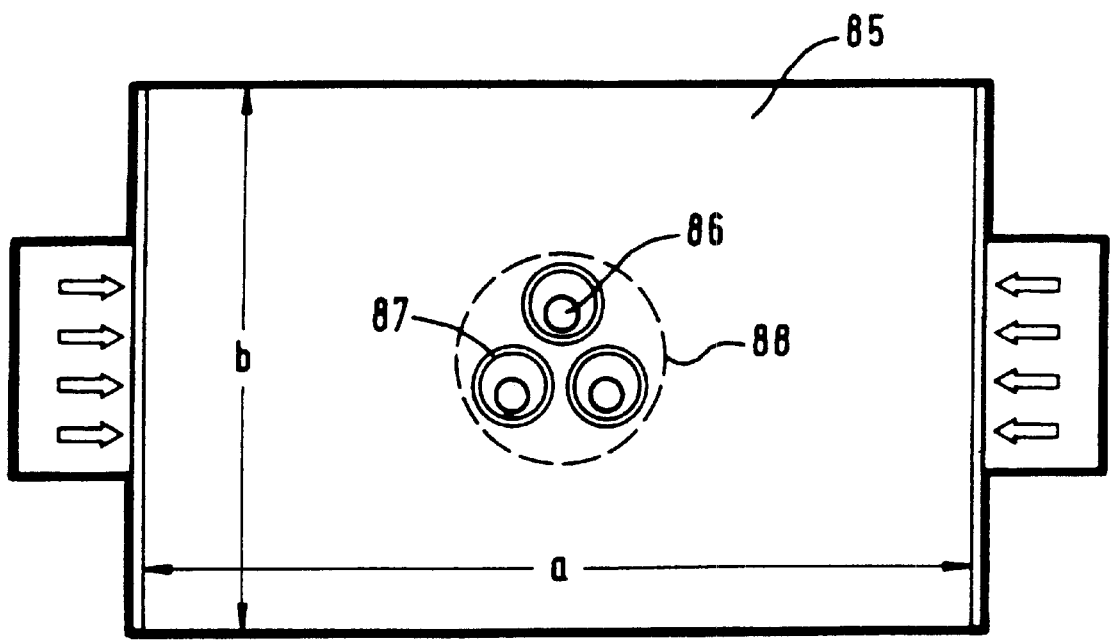

The dimensions of a=30 cm and b=20 cm have been chosen for the cross section of the resonance chamber in FIG. 8, perpendicularly to the slotted walls. In this case, there may also advantageously be six fuel holders provided, the configuration of which can then correspond, for example, to the corners of a regular hexagon disposed around the center point of the cross section. In addition, a fuel holder may also be provided in the center axis itself, so that seven layers of nuclear fuel can be sintered simultaneously.

If the transport rate of the fuel in the tube is increased in order to increase the throughput, it may be necessary to increase the length of the furnace. In this case, two resonance chambers constructed on the basis of the considerations presented are disposed one behind the other, so that a resonance chamber composed of two resonator subchambers with a continuous holder for the fuel is produced. In a simple case, the two subchambers are interconnected by a diaphragm, in order to decouple the microwave fields of the two subchambers. However, it also appears to be possible to work without a diaphragm which shields the subchambers from each other. It is possible in this case to work with a single ceramic tube having a corresponding length as the fuel holder. Otherwise, tubes butting against one another which are fitted into connecting sleeves can be used.

In order to provide for the extraction of the microwaves from the stationary wave formed in the antenna cavity, it is advantageous if the smallest distance between the center point of an opening and the edge of the opening is not greater than approximately 4% of the wavelength. A slot width of approximately 5 mm (in any event less than 10 mm) was chosen for the frequency of 2.45 GHz used herein. In the other direction, the opening may be more extended (up to approximately half the wavelength). Under these conditions, no sparkovers between the metallic edges of the slots were observed at the slots. The distance between the center points of these openings should be at least half a wavelength. Therefore, the proportion of the surface area taken up by the openings in the separating wall of the antenna cavity is restricted to less than 5%. In the case of the elongate antenna cavities, the slots are not disposed in the longitudinal direction on the center line of an antenna cavity side wall but instead are offset with respect to the center line. It is possible, for example, for the slots to be alternately offset toward both sides. In this case, it has proven to be advantageous if the slots are not distributed uniformly in the longitudinal direction but instead the feeding of the microwaves emitted by the microwave radiator is disposed in the vicinity of one end of the antenna cavity and the slots extend from the other end over the length (advantageously approximately half to three-quarters of the length). The distance d of the individual slots from the center line was optimized in the manner described with respect to FIG. 2 with regard to the most uniform possible temperature distribution in the fuel. A uniform distance d of approximately 15 mm is taken as a basis.

It should be noted that details of the individual exemplary embodiments shown in FIGS. 2 to 9 can also be transferred to other exemplary embodiments.

The temperature distribution and the configuration of the slots which are obtained in this case are represented in FIG. 9. In this case, reference numeral 91 represents approximately the location at which one waveguide opens into its assigned antenna cavity. Reference numeral 92 represents the shape and the longitudinal position of the slots in the wall between this assigned antenna cavity and the resonance chamber. In a corresponding way, reference numeral 93 represents the opening of the other waveguide into the other antenna cavity and reference numeral 94 represents the position and shape of the slots in the wall between the other antenna cavity and the resonance chamber. It is noted that the furnace according to FIG. 7 has been used. The slots 92 belonging to the one antenna cavity in this case all lie on one side, those belonging to the other antenna cavity all lie on one side in a rear half of the resonance chamber, while the slots 94 belonging to the other antenna cavity are disposed diametrically opposite thereto.

The nuclear fuel includes customary uranium oxide pellets, which were pushed at a rate of 4.4 mm/minute through the furnace, the overall length of which was 1.1 m. The temperature distribution represented was virtually constant over time after a relatively short warming-up time. The sinter density of the pellets was largely homogeneous and lay in the usable range from 10.2 to 10.6 g/cm$^3$. The temperature used in this case is significantly lower than the temperature required in the case of conventional furnaces for a sintered compact of the same density. This is because, in microwave sintering, the fuel is only warmed up to a slight extent by the contact with hot gases or superficial absorption of thermal radiation in a manner progressing inward from the surface of the fuel, but in the entire volume by absorption of the microwave rays. Therefore, the sintering times are shortened and/or it is possible to work with much lower temperatures. Consequently, if it is maintained that higher temperatures would be required in the microwave sintering of ceramic, this is likely to be attributable to defective measuring methods (the temperature sensor is itself warmed up by the microwaves), and high energy losses indicate inadequate technology.

This consequently provides a possible way of defining a method and a furnace for the thermal treatment of nuclear fuel at high temperatures with microwaves on an industrial scale, without involving excessive experimental effort.

We claim:

1. A method for treating nuclear fuel in a microwave furnace, which comprises:
   feeding microwaves from a microwave radiator through a waveguide into an antenna cavity;
   maintaining a stationary wave in the antenna cavity;
   feeding the microwaves from the antenna cavity through a plurality of narrow connecting openings into a resonance chamber; and
   introducing nuclear fuel into the resonance chamber.

2. The method according to claim 1, which further comprises radiating different outputs, matched to a defined temperature profile in the nuclear fuel, into the resonance chamber individually through the connecting openings.

3. The method according to claim 1, which further comprises holding the nuclear fuel in a tube filled with sintering gas and warming the nuclear fuel with the microwaves to temperatures between 20 and 2200° C.

4. The method according to claim 1, which further comprises holding the nuclear fuel in a tube filled with sintering gas and warming the nuclear fuel with the microwaves to an average temperature between 1400 and 1800° C.

5. The method according to claim 1, which further comprises introducing the nuclear fuel on one side of the furnace, transporting the nuclear fuel through the furnace during sintering, and removing the nuclear fuel on another side of the furnace.

6. The method according to claim 5, which further comprises passing a sintering gas through a resonance chamber counter to a transporting direction of the nuclear fuel.

7. The method according to claim 5, which further comprises passing a sintering gas through the resonance chamber counter to a transporting direction of the nuclear fuel in a tube made of ceramic surrounding the nuclear fuel.

8. The method according to claim 1, which further comprises providing the resonance chamber with an elongate shape, and offsetting the narrow connecting openings with respect to one another in a longitudinal direction.

9. The method according to claim 1, which further comprises providing the resonance chamber with an elongate, cuboidal shape, and offsetting the narrow connecting openings with respect to one another in a longitudinal direction.

10. The method according to claim 1, which further comprises shaping the narrow connecting openings as slots.

11. The method according to claim 1, which further comprises providing the antenna cavity with an elongate shape and a cross section adapted to a frequency of the microwave radiator, and providing the resonance chamber parallel to the antenna cavity, with approximately the same length and with a larger cross section.

12. The method according to claim 1, which further comprises placing a plurality of layers with the nuclear fuel in the resonance chamber.

13. The method according to claim 12, which further comprises distributing the nuclear fuel approximately in a symmetrical configuration about a center axis of the resonance chamber over a cross section of the resonance chamber.

14. The method according to claim 1, which further comprises feeding microwaves from another microwave radiator into another antenna cavity radiating microwaves through a plurality of other narrow connecting openings into the resonance chamber.

15. The method according to claim 1, which further comprises feeding microwaves from at most three other microwave radiators into at most three other antenna cavities radiating microwaves through at most three other sets of narrow connecting openings into the resonance chamber.

16. The method according to claim 1, which further comprises generating the microwaves at a frequency of between 0.4 and 30 GHz.

17. The method according to claim 1, which further comprises generating the microwaves at a frequency of approximately 915 MHz.

18. The method according to claim 1, which further comprises generating the microwaves at a frequency of approximately 2.45 GHz.

19. The method according to claim 1, which further comprises introducing the nuclear fuel into the resonance chamber and removing the nuclear fuel from the resonance chamber through respective metallic tubes.

20. The method according to claim 1, which further comprises introducing the nuclear fuel into the resonance chamber through a chamber filled with hot sintering gas and substantially free from microwaves, and removing the nuclear fuel from the resonance chamber through a chamber filled with cold sintering gas and substantially free from microwaves.

21. The method according to claim 1, which further comprises passing the nuclear fuel through an insulation disposed within the resonance chamber for insulating against emission of heat.

22. A method for treating nuclear fuel in a microwave furnace, which comprises:

feeding microwaves from a microwave radiator into an antenna cavity;

providing a resonance chamber having a wall with first parts and second parts movably held on the first parts;

feeding the microwaves from the antenna cavity through a plurality of narrow connecting openings in the second parts into a resonance chamber;

introducing nuclear fuel into the resonance chamber; and setting a defined temperature profile in the nuclear fuel by changing a position of the narrow connecting openings.

23. A method for treating nuclear fuel in a microwave furnace, which comprises:

feeding microwaves from a microwave radiator into an antenna cavity;

providing a resonance chamber having a wall with first parts and second parts movably held on the first parts;

feeding the microwaves from the antenna cavity through a plurality of narrow connecting openings in the second parts into a resonance chamber;

introducing nuclear fuel into the resonance chamber; and setting a defined temperature profile in the nuclear fuel by changing a position of the narrow connecting openings.

* * * * *